Patented Oct. 2, 1945

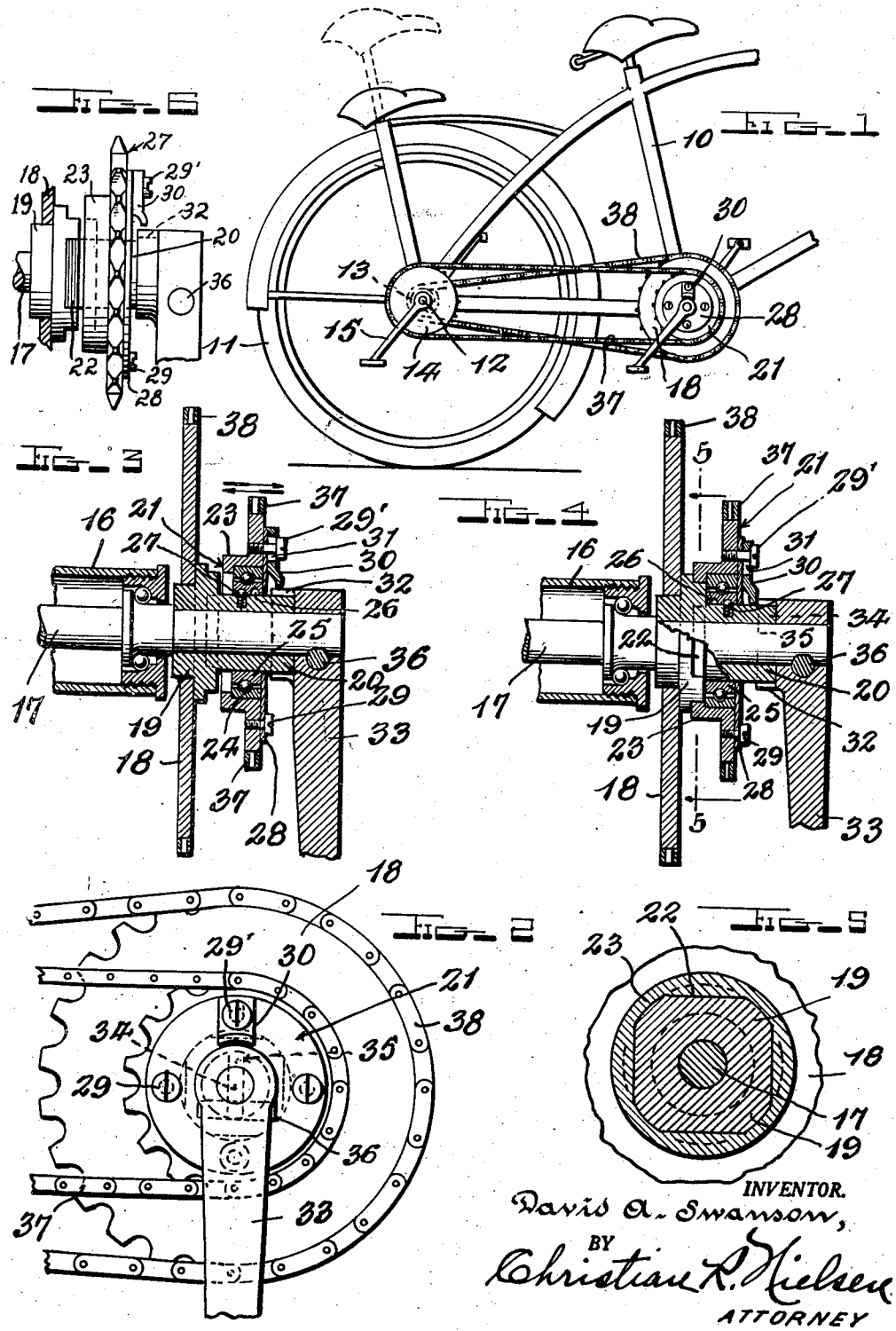

2,385,892

UNITED STATES PATENT OFFICE 2,385,892

FRONT HANGER FOR CONVERTIBLE TANDEM BICYCLES

David A. Swanson, Chicago, Ill.

Application May 5, 1943, Serial No. 485,767

2 Claims. (Cl. 74—594.2)

This invention relates to improvements in a drive for convertible tandem bicycles, and it consists in the constructions, arrangements and combinations herein described and claimed.

More particularly, the drive concerns that type in which a rear crank shaft is mounted within or extended through the rear wheel hub and interconnected with a usual front sprocket to effect propulsion of a bicycle.

It is the cardinal object of the invention to provide a connection between the front sprockets which will permit the quick conversion of the bicycle from single to tandem use at the will of the driver, and without the use of tools.

It is also an object of the invention to provide a connecting means for the front sprockets along lines of simplicity and durability, so as to reduce the cost of manufacture.

It is a still further and important object of the invention to provide a connecting means for the front sprockets without the need for threading or any other keying or securing devices other than that ordinarily employed in hanger constructions of the type specified.

Additional objects, advantages and features of invention will be apparent from the following description considered in conjunction with the accompanying drawing, wherein Figure 1 is a fragmentary side elevation of a convertible tandem bicycle having my mechanism installed.

Figure 2 is an enlarged fragmentary side elevation illustrating the front driving sprockets in disengaged position.

Figure 3 is a vertical cross section through the structure shown in Figure 2.

Figure 4 is a similar view illustrating the sprockets in connected relation for tandem use.

Figure 5 is a cross section on the line 5—5 of Figure 4.

Figure 6 is an elevational view illustrating the relation of the hub of the driving sprocket and idling sprocket in disengaged position.

Reference is first made to Figure 1 of the drawing, wherein there is illustrated the rear portion of a tandem bicycle 10, the rear wheel of which is indicated at 11. The rear wheel includes sprockets 13 and 14 and a crank shaft 12 upon which there is mounted pedal cranks 15. This construction may be similar to that shown in my Patent No. 2,277,727. The front crank hanger 16 revolubly mounts a crank shaft 17 adjacent to one end of which there is keyed or otherwise fixed a sprocket 18. The sprocket 18 is provided with a hub 19 through which the crank shaft is extended and keyed. The hub has integrally formed therewith a sleeve 20 for mounting of a normally free-running sprocket 21 as will be described. The hub 19 is also formed with flats 22 adapted to align with flats formed in the hub 23 of the sprocket 21 and when in engaged position, the sprockets 18 and 21 will be rotated in unison.

Within the hub 23 a ball bearing assembly 24 is housed, the inner race 25 of which is mounted on the hub 20 and is provided with a pair of recesses 26 longitudinally spaced upon the inner periphery thereof. A spring-pressed detent 27 is alternatively complemental to the recesses 26 for maintaining the sprocket 21 in operative or inoperative position with the driven hub 19 of the sprocket 18.

A dust or closure plate 28 is detachably mounted upon the sprocket 21 by means of machine screws 29 and 29', the plate being apertured to receive the sleeve 20 therethrough and lies snugly against the bearing assembly 24, thereby preventing ingress of foreign particles into the bearing assembly. The screw 29' is slightly longer than the screws 29 and mounts a sliding catch 30. In the present instance, the catch is shown as having an elongated slot 31 for receiving the screw 29'. The catch 30 is slidable toward and away from the sleeve 20 so as to present its lower end behind a shoulder 32 of the crank pedal 33, when the sprockets 18 and 21 are in connected relation.

The sleeve 20 is here shown as having a tongue 34 at its end adapted to engage in a slot 35 of the pedal crank, the latter being keyed to the shaft 17 as at 36. By this construction a single key 36 functions to secure the pedal crank 33, the sleeve 20 and the gear 18 for unitary rotation, and it will be seen that by eliminating key devices for the gear 18, special machining has been avoided, as well as maintaining normal strength of the shaft.

In a convertible tandem as illustrated in Figure 1, the power applied to the rear driving sprocket 14, through the rear pedal cranks 15 is transmitted through a chain 37 to the front driven sprocket 21, which ordinarily idles freely upon the front crank shaft so that a single rider may rotate the front crank shaft without the added friction of a second chain, but which, when connected to the main driving sprocket 18 transmits the power through chain 38 to the rear wheel sprocket 13 in the usual manner.

We will assume that the sprockets 18 and 21 are in the positions shown in Figure 3, and it is desired to convert the bicycle to a tandem drive which will require that the sprockets be connected for unitary rotation. In order that this may be done, it is only necessary to exert a lateral pressure on the sprocket 21 in the direction of the sprocket 18, the flats 22 being aligned with the flats of the hub, the sprocket will slide inwardly upon the hub to the position shown in Figure 4. In this position, the detent 27 will be engaged in the outermost recess 26. The screw 29' is loosened by using a coin positioned in the slot of the screw, allowing the catch 30 to slide downwardly behind the shoulder 32 of the pedal crank. The sprocket 21 is thus rigidly connected to the shaft 17 and sprocket 18. To convert the bicycle to solo operation, the screw 29' is loosened, the catch raised to an upper position so as to be removed from the shoulder of the crank pedal and then secured by tightening the screw 29'. The gear 21 is next shifted laterally, so as to be free of the flats 22.

While I have shown and described a preferred form of the device, this is by way of illustration only, and I consider as my own, all such modifications in construction as fairly fall within the scope of the appended claims.

I claim:

1. In a tandem drive for bicycles or the like including a front pedal drive shaft, a sprocket fixed to the shaft and including a hub portion having flats on its periphery, a normally free idling sprocket on the shaft having a hub provided with flats complemental to the flats of the first hub, when the idling sprocket is shifted laterally, detent means for maintaining the idling sprocket fixed in either of its shiftable positions, a crank pedal fixed to the shaft outwardly of the idling sprocket, and an adjustable catch carried by said idling sprocket movable to a position between the crank pedal and the idling sprocket for maintaining the latter in coupled engagement with the first named sprocket.

2. In a tandem drive for bicycles and the like including a front pedal drive shaft, a sprocket fixed to the shaft and including an integral axial sleeve, a normally free idling sprocket on the sleeve shiftable laterally to engage the first named sprocket for interlocking engagement therewith, a crank pedal fixed to the outer end of the drive shaft and manually operable means on the idling sprocket movable to a position between the crank pedal and said idling sprocket for interlocking and maintaining the idling sprocket in rotary engagement with the first named sprocket.

DAVID A. SWANSON.